United States Patent [19]
O'Mahony et al.

[11] Patent Number: 5,490,431
[45] Date of Patent: Feb. 13, 1996

[54] MAGNETIC TORSION METER FOR MEASURING TORQUES

[76] Inventors: Gerard M. O'Mahony, 95 rue de Versailles, 92410 Ville D'Avray; Lucien P. Slama, 4 Rue Mayran, 75009 Paris, both of France

[21] Appl. No.: 385,308

[22] Filed: Feb. 7, 1995

[30] Foreign Application Priority Data

Feb. 8, 1994 [FR] France .................. 94 01371

[51] Int. Cl.⁶ ........................................... G01L 3/02
[52] U.S. Cl. ..................... 73/862.331; 73/862.325
[58] Field of Search .............. 73/862.325, 862.326,
73/862.331, 862.329, 862.332, 862.328,
116; 324/207.11, 207.13

[56] References Cited

U.S. PATENT DOCUMENTS

| | | | |
|---|---|---|---|
| 4,680,976 | 7/1987 | Lustenberger | 73/862.331 |
| 4,876,899 | 10/1989 | Stroti et al. | 73/862.332 X |
| 4,907,460 | 3/1990 | Taniguchi et al. | 73/862.331 |
| 4,984,474 | 1/1991 | Matsushima et al. | 73/862.325 |
| 5,027,663 | 7/1991 | Frister et al. | 73/862.331 |

FOREIGN PATENT DOCUMENTS 2689633  10/1993  France .
4231646  8/1993  Germany .

*Primary Examiner*—Kenneth A. Wieder
*Assistant Examiner*—Elizabeth L. Dougherty
*Attorney, Agent, or Firm*—Oliff & Berridge

[57] ABSTRACT

In a magnetic torsion meter for measuring the torque exerted on a rotating assembly, the rotating assembly includes first and second sections of a rotating shaft brought together by a torsion shaft. The torsion meter includes an exterior U-shaped fixed magnetic circuit. A continuous source of magnetic excitation creates a flux through the circuit and gaps of the first and second rotors. The first and second rotors each include an annular disk made of a non-magnetic material. The disks each include two concentric coils of ferromagnetic pins. The pins of the first rotor face the pins of the second rotor while defining two measuring gaps. The relative angular position of pins on both sides of the measuring gap is such that the reluctances are equal when no torque is applied but vary inversely when a nonzero torque is applied. The torsion meter includes at least two magnetic induction sensors housed in one of the smooth gaps of the U-shaped magnetic circuit. The sensors measure magnetic flux and output results to a treatment circuit, which produces a signal proportional to the angle of torsion.

17 Claims, 6 Drawing Sheets

MAGNETIC TORSION METER FOR MEASURING TORQUES

BACKGROUND OF THE INVENTION

The present invention relates to a magnetic torsion meter for measuring torques by means of a torsion shaft and which is particularly adapted for measuring large size shaft torsion, such as marine screws propeller shafts, turbine propeller shafts, grinder propeller shafts, etc . . . , subject to a torque effect.

Torsion meters generally use a torsion bar having its extremities are connected respectively to a shaft end providing an engine torque and to a shaft end presenting a load moment. The torsion bar which can rotate relative to an exterior box having two annular gears and their respective stationary coils, comprises two toothed disks mounted on both extremities of the torsion bar. Whenever the disk teeth pass in front of the gear teeth, a variation of the magnetic flux and a signal modulation in the coils are produced correlatively and their respective phase shift can then be measured with a phase indicator. However, such a device requires the use of complicated electronic circuits necessary to the phase shift synchronization. In addition this measuring method is not suited to the study of transient phenomenon and is not adapted to measuring when stopped.

Hence, French patent FR 2 689 633 proposed a magnetic torsion meter made of an angular comparator comprising first and second toothed rotors made of ferromagnetic material. The first and second rotors are respectively connected to the first and second extremities of a rotating shaft, the teeth of each rotor facing each other and defining a gap. An exterior magnetic circuit with a constant reluctance is a static circuit made of ferromagnetic material with its first and second extremities respectively facing non-toothed cylindrical parts of the first and second toothed rotors while respectively defining between them first and second transfer gaps. In such a torsion meter, a Hall effect sensor is installed in a measuring gap defined in the exterior magnetic circuit. An excitation source creates a flux. The sensor delivers an amplification electric signal proportional to the reluctance variation in the measuring gap and therefore to the torque applied to the rotating shaft.

However, such a device does not allow for carrying out an absolute torque measurement as there is no zero reference. This is an important feature of this device.

It will be noted that an electronic correction of the measuring signal, which would make it possible to display zero for a nil torque, is not able to cover the whole range of variation of the perturbing parameters of mechanical or thermal origin.

Moreover it would require an absolute stability of the power supply source of the Hall effect sensor.

It would be possible to imagine an improvement of the device mentioned in patent FR 2 689 633, in order to obtain an absolute measurement of the torque, by attaching two similar devices and mounting them head to tail along the torsion shaft, these equal and opposite device measuring signals counteracting each other, the common face being used as a reference.

This solution is not entirely satisfactory as the two devices, despite their similar design, would necessarily have imperfections and their Hall effect sensors would have different laws of variation, and then still resulting in an impossible compensation all throughout the signal variation range.

In conclusion, the device of French patent FR 2 689 633, whatever the improvements are, does not make the absolute measurement of the torsion and torque possible.

SUMMARY OF THE INVENTION

The present invention precisely aims at realising a magnetic torsion meter, that eliminates the above-mentioned disadvantages. The meter has a notably smaller weight and space requirement than the prior art devices, yet authorizes measuring precision higher than that of the devices of the prior art. It is obvious that the invention must be able to adapt to real shafts in order to be able to carry out torque measurements on an existing kinematic chain without dismantling the kinematic chain. Above all the invention must make the absolute measurements of the torsion and torque possible.

These goals are reached by a magnetic torsion meter for measuring the torque (C) exerted on a rotating assembly comprising the first and second sections of the rotating shaft coupled by a torsion shaft and first and second rotors respectively connected to the first and second sections of the rotating shaft so that, under the effect of the applied torque (C) these first and second rotors move the one relative to the other by a angle of torsion ($\gamma$) proportional to torque (C).

The magnetic torsion meter comprises an exterior U-shaped fixed magnetic circuit, whose magnetic flux created by a continuous magnetic excitation source closes up through gaps through the first and second rotors. The first and second rotors comprise annular disks made of non-magnetic material, each one comprising two concentric coils of ferromagnetic pins. The pins of the first rotor are installed opposite the pins of the second rotor while defining two coils of measuring gaps. The relative position of the pins located on both sides of the same measuring gap is such that the gap reluctance ($r1(\gamma)$, $r2(\gamma)$) per pair of pins is equal for the two gap coils with a nil torque. However these reluctances ($r1(\gamma)$, $r2(\gamma)$) vary in the opposite direction depending on the coils when an angle of torsion ($\gamma$) appears, due to the applied torque (c). Moreover, it comprises at least two magnetic induction sensors located in one of the smooth gaps of the U-shaped magnetic circuits, and measuring the magnetic flux corresponding to the pins of each coil in one of the first and second rotors, varying in the opposite direction with the angle of torsion ($\gamma$). These two sensors are associated with a treatment circuit producing an electric signal output proportional to the angle of torsion ($\gamma$).

Thus, with such a structure, due to the local confinement of the lines of flux to the only magnetic pins concerned (like a d.c. commutator motor), the magnetic leaks are minimized and the precision of the device is increased. Moreover, the reduction of the exterior magnetic circuit to a single bow covering a limited area makes it possible to reduce the size of the device. The integration of the electronic supply and measurement circuits can then be located at close proximity to the magnetic measuring sensors.

According to the invention, the special structure of the device makes the realization of a double magnetic comparator possible whose variations of reluctance in opposition directions result in doubling the device sensibility. Moreover, such an arrangement constitutes what is called a "zero apparatus" whose quiescent value then results from its geometry.

According to a special characteristic of the present invention, the magnetic pins are T-shaped, the pins of the first and second coils of the first rotor being magnetically connected two by two, and the pins of the first and second coils of the second rotors being inversely magnetically isolated.

These pins can be machined in a conventional ferromagnetic material or obtained by sintering, starting from high resistant magnetic powder, which makes the operation of the device at high rotation speeds possible.

Advantageously, the torsion meter comprises a mechanical protection device limiting the relative angular displacements between the first and second rotors in order to limit the maximum torque applicable to the torsion shaft. This protective device comprises at least one male element interdependent with one of the first and second rotors and at least one female receiving element interdependent with the other first and second rotors in order to receive this male element with a predetermined clearance.

This protective device against an accidental rupture of the torsion shaft is especially interesting in the case where the torsion meter is incorporated in a motor operator servo control device, such as for electrically assisted power steering electrically assisted of a road vehicle.

The source of continuous magnetic excitation may comprise a solenoid a toroid or a permanent magnet.

To ensure a measurement redundancy and thus confer greater reliability to the torsion meter according to the invention, the meter may comprise several exterior U-shaped fixed magnetic circuits distributed at the periphery of the disks of the first and second rotors, with their own associated magnetic induction sensors and treatment circuits.

The magnetic induction sensors may be made of Hall effect sensors or magneto resistors.

According to a special embodiment, the feed circuits of the magnetic induction sensors and treatment circuits of the signals delivered by these sensors are positioned against one of the exterior lateral walls of the U-shaped fixed magnetic circuit.

According to a first possible application, especially adapted to the measurement of torques applied to large size shafts such as marine propeller shafts, turbo-generator or crusher shafts for example, the torsion shaft is made directly from a twistable shaft section of an existing shaft, and each of the first and second rotors are connected mechanically through two rigid hemi-cylindrical sections surrounding the twistable shaft section to two sections far from the rotating shaft subjected to the angle of torsion (γ). This arrangement makes it possible to mount and dismount the torsion meter without breaking the shaft.

According to another possible application, the magnetic torsion meter according to the invention is incorporated into a motor operator servo control device, such as electrically assisted power steering of a road vehicle.

BRIEF DESCRIPTION OF THE DRAWINGS

Other characteristics and advantages of the present invention will be presented better in the following description, which is informative but not limitative, and in the attached drawings, where.

DESCRIPTION OF PREFERRED EMBODIMENT

Figure 1:
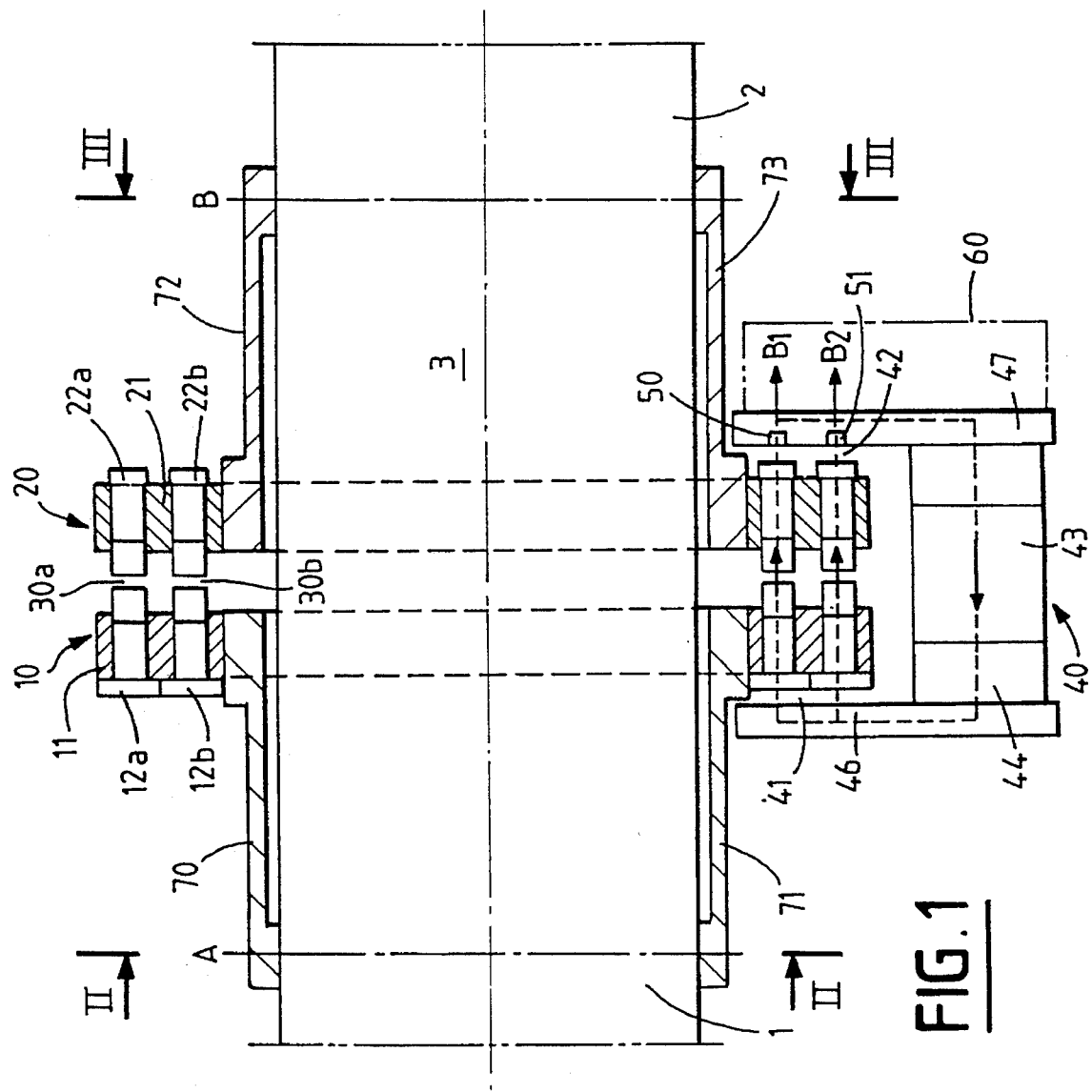
FIG. 1 is an axial cutaway view of the first embodiment of a torsion meter according to the invention.

FIG. 1 shows a section of a large size rotating shaft comprising a twistable part 3, between the first and second sections 1, 2, the shaft being connected to a torque measuring device conforming to the invention. When the first section 1 is connected to a motive unit and the second section 2 to a receiving unit, or vice versa, a torque C is transmitted by the motive unit to the receiving unit through the twistable part 3 of the rotating shaft thus generating a relative angular displacement γ between the two sections, proportional to the torque C applied.

The device according to the invention, which constitutes a magnetic torsion meter, allows for simply determining this angular shift γ and therefore the applied torque C.

In this preferred embodiment of the invention shown in FIG. 1, the torsion meter essentially comprises a double angular comparator constituted by a first rotor 10 made of non magnetic material (e.g. aluminium or glass fiber) which is rigidly connected at the level of a first radial plane A to the first section 1 of the rotating shaft. The torsion meter further consists of a second rotor 20 also made of non magnetic material which is rigidly connected at the level of a second radial plane B to the second section 2 of this rotating shaft. Each rotor which is in rotation interdependent with the shaft section to which it is connected, is constituted by an annular disk 11, 21 comprising a series of pins made of ferromagnetic material 12a, 12b, 22a, 22b, regularly spaced one from another and arranged on the concentric coils, pins 12a, 12b of the first rotor 10 being located facing pins 22a, 22b of the second rotor 20 by defining measuring gaps 30a, 30b.

In the example shown, the connection between the rotors and the rotating shaft sections is made by means of rigid hemicylindrical sections made of non magnetic material, which are variable in number, for instance 70 to 73, extending around the twistable part 3 of this rotating shaft. Conventionally, the hemicylindrical sections may be secured to the shaft sections by means of anchoring elements (not shown) located in the radial planes A and B.

Since the rotors are rigidly connected to the rotating shaft sections 1, 2 on both sides of the twistable part 3 of the rotating shaft, the surface facing the magnetic pin series 12a, 12b; 22a, 22b of rotors 10, 20 is directly linked to angle of torsion γ which, as mentioned above, varies linearly way with the torque to be measured. The reluctance of measuring gap 30a, 30b is therefore a direct function of the torque C to be measured, for a given geometry.

According to the invention, this rotating reluctance is looped on an exterior magnetic circuit 40, which is static and has a known constant reluctance, through two smooth gaps 41, 42 which ensure the flux continuity between this exterior circuit and rotors 10, 20 of the magnetic comparator. This exterior magnetic circuit is bow-shaped or U-shaped and extends over a limited area of annular rotors 10,20 and covers at least one magnetic pin 12a, 12b; 22a, 22b of each coil.

Figure 9:
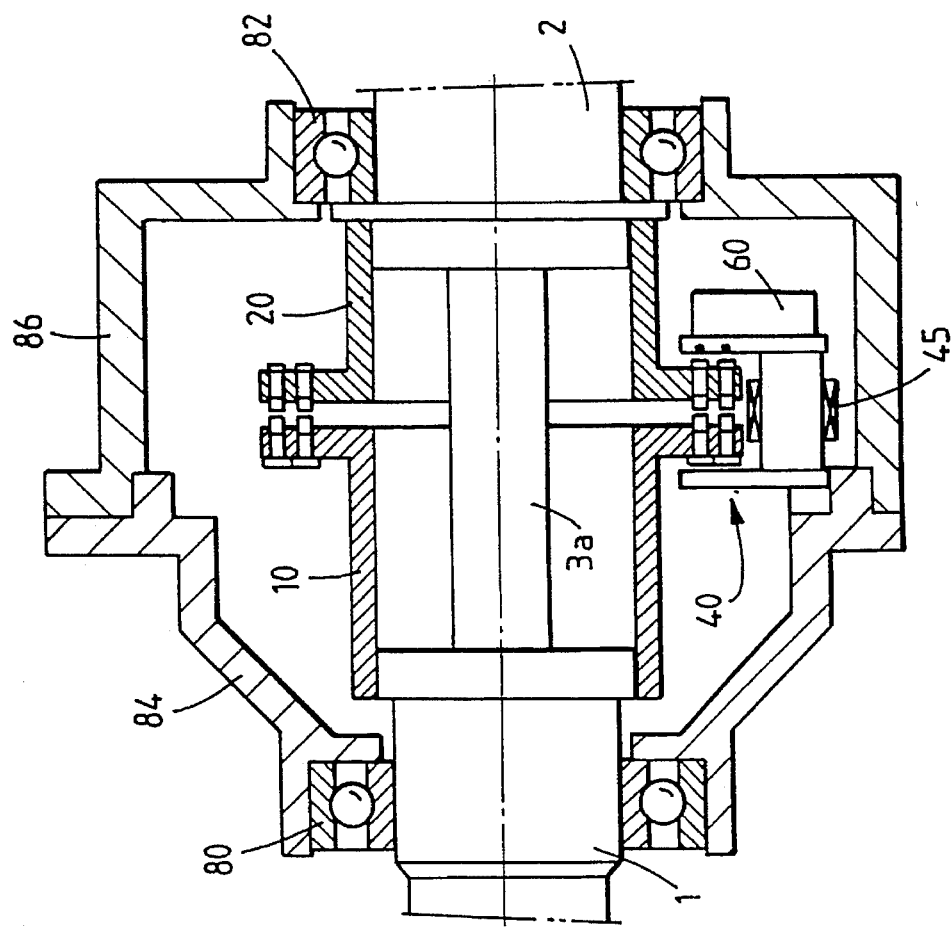
FIG. 9 is an axial cutaway view showing a particular example of torsion meter implementation according to the invention.

A continuous magnetic excitation means is associated with exterior magnetic circuit 40 to produce a magnetic flux through this circuit and rotors 10, 20, the variation of which will depend on the reluctance variation in the measuring gaps 30a, 30b. This excitation means may be constituted by one or more continuous magnets 43 located in the body of bow 44 or, as represented in FIG. 9, by a torus or a solenoid 45 centered on the bow body and fed by a constant discontinuous current.

Figure 8:
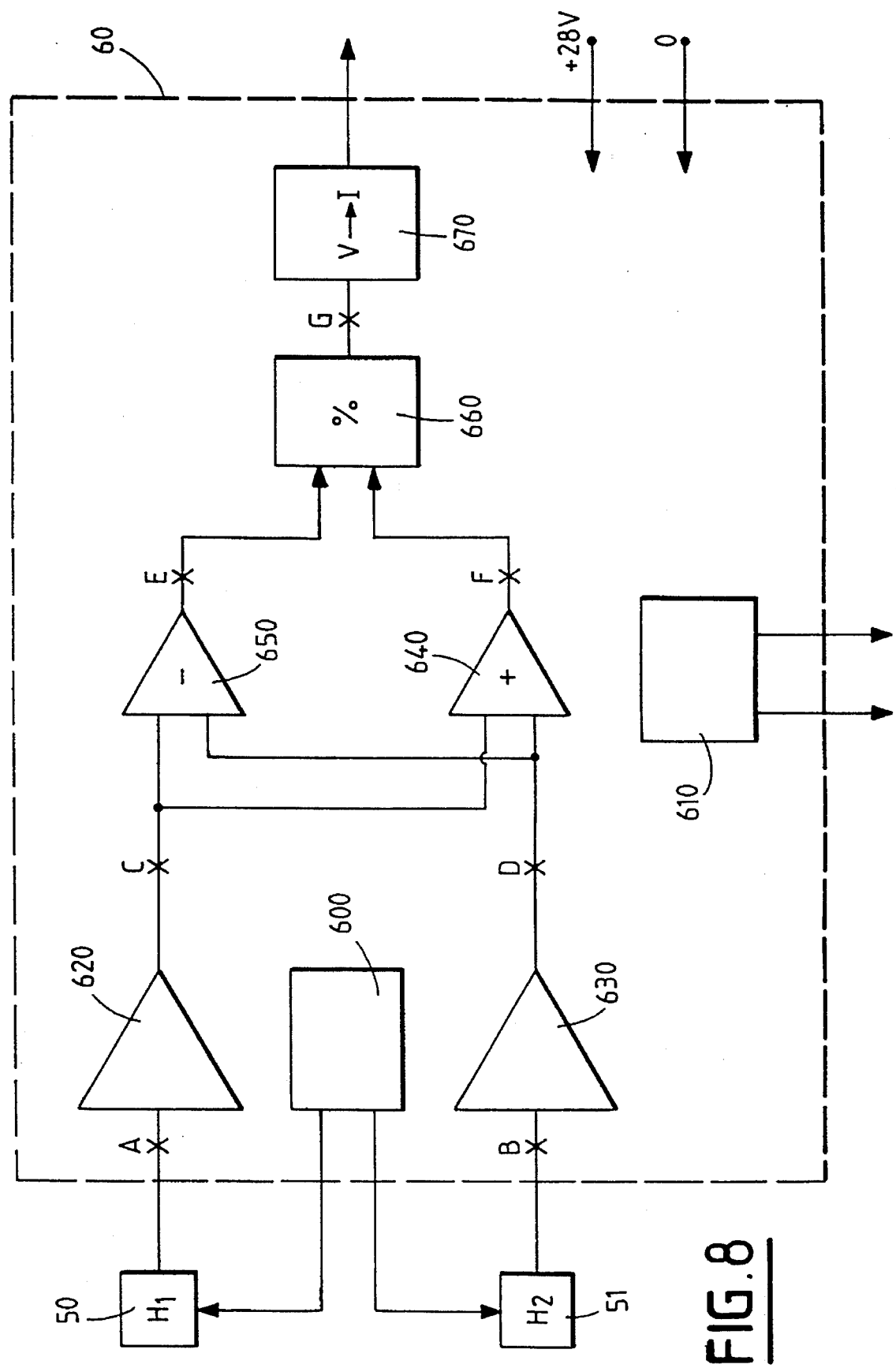
FIG. 8 shows the measurement flow chart from the signals collected at the magnetic induction measurement signal pins.

The reluctance variation in the measuring gaps is determined by at least one magnetic measurement sensor, for instance a Hall effect sensor 50, 51 or a magneto resistor device, located in a smooth gap 42 at the level of the exterior magnetic circuit. In practice, these sensors are secured in one of the internal side walls 46,47 of the bow which are facing each of annular rotors 10, 20 and thus the analog electrical signal provided by these sensors can be treated immediately by a treatment circuit 60, preferably located at the level of the receiving side wall of these sensors. This treatment circuit can group the sensor feed circuits and the amplification circuits of the measuring signal at the same time, as described further on with reference to FIG. 8, but also compensation circuits of thermal drifts.

Figure 4:
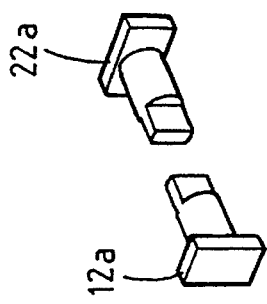
FIG. 4 shows a first example of embodiment of the magnetic pins of the torsion meter disks according to the invention.
Figure 3:
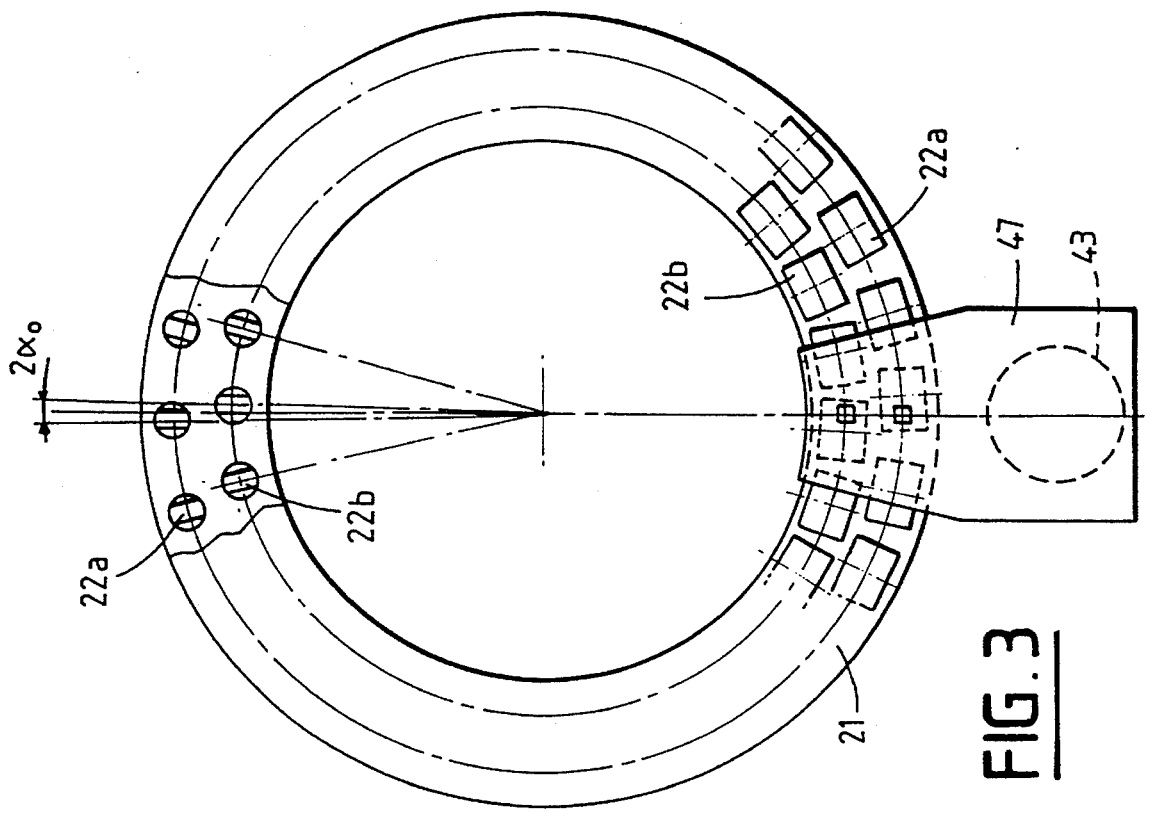
FIG. 3 is an exterior view along line III—III of FIG. 1 of the second disk of a torsion meter with a part of it removed.
Figure 2:
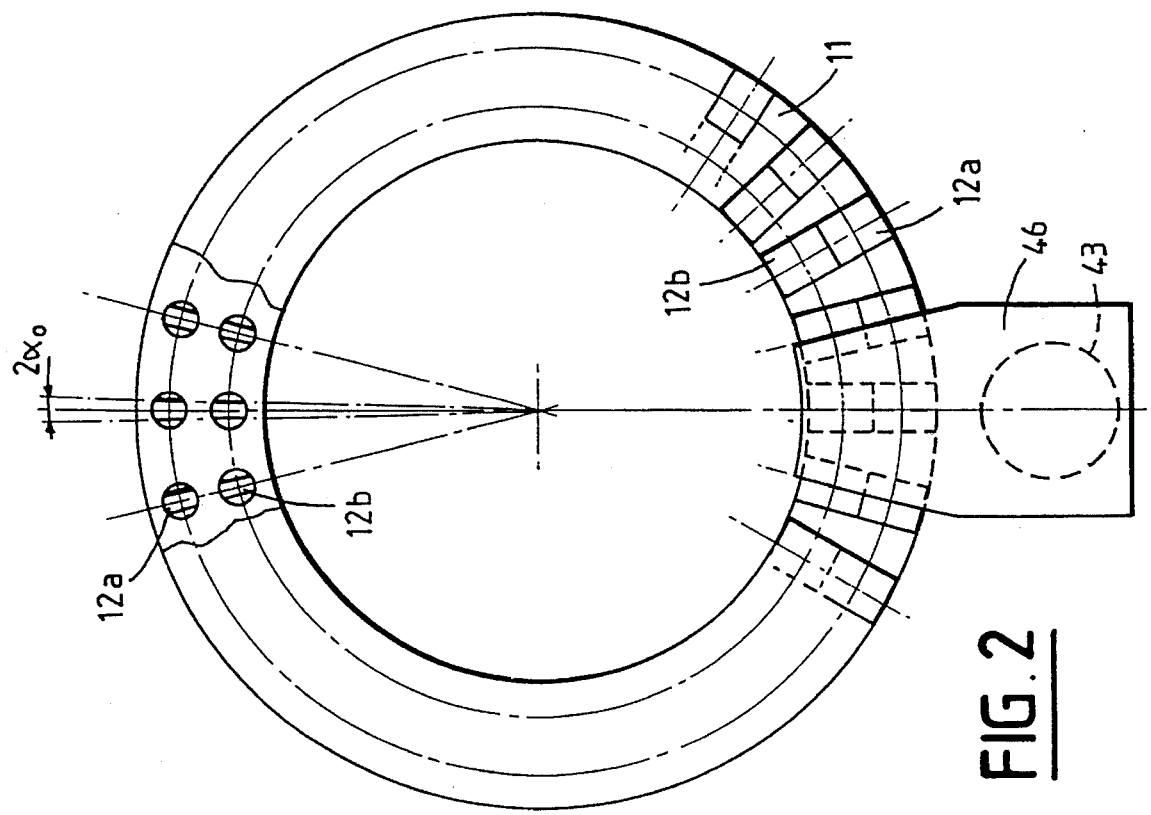
FIG. 2 is an exterior view according to line II—II of FIG. 1 of the first disk of a torsion meter partially with a part of it removed.
Figure 10:
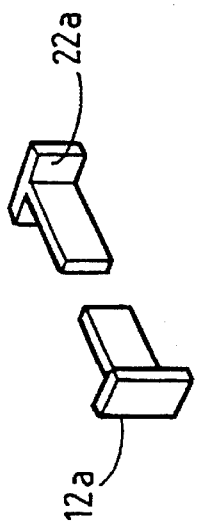
FIG. 10 is a second example of realization of the magnetic pins of the torsion meter disks according to the invention.

FIGS. 2 and 3 are exterior views respectively according to planes II—II and III—III of FIG. 1, the rotating shaft and hemicylindrical sections being removed. As it can be seen on these figures, the U-shaped pins made of ferromagnetic material, (e.g. refer to the two different embodiments of FIGS. 4 and 10) distributed over two concentric coils, are installed so that pins 12a, 12b of the first and second coils of the first disk 11 are magnetically linked two by two (see FIG. 2) while pins 22a, 22b of the first and second coils of the second disk 21 are inversely magnetically isolated (see FIG. 3). A magnetic connection, present or not, simply results in a different orientation (at 90°) of the pins of the first and second disks, in one case the orientation makes a contact between the two superimposed pins heads of the two coils possible, and in the other case such a contact is impossible.

Figure 5A:
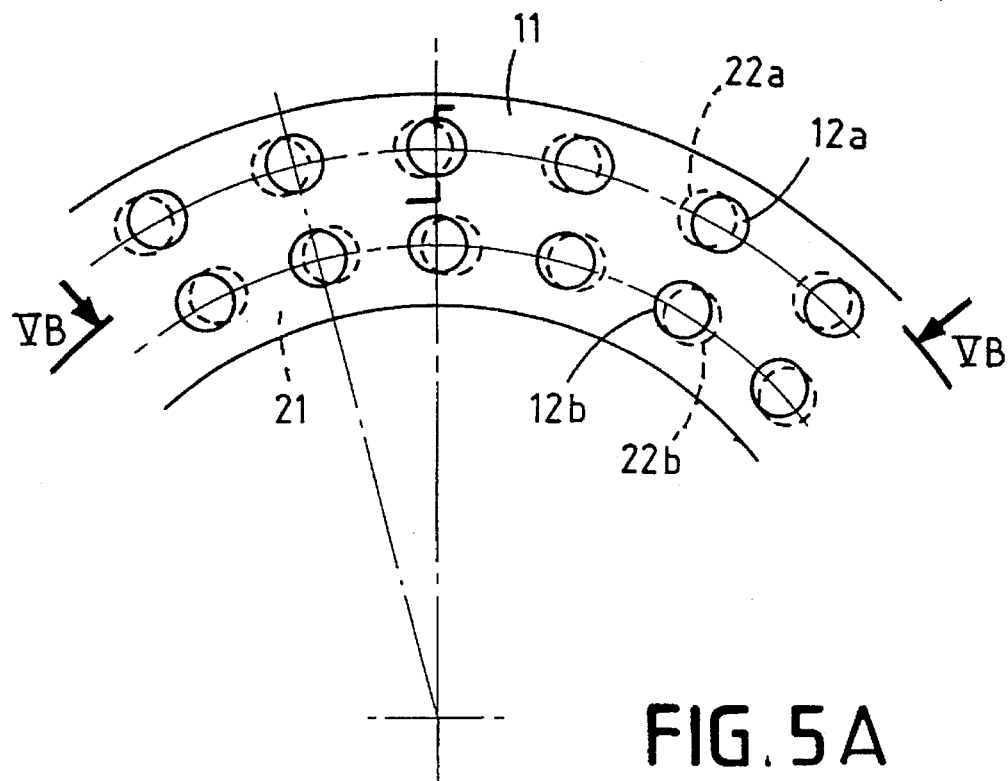
FIGS. 5A and 5B show the details of the pin arrangement constituting the disks of FIG. 2 and 3.
Figure 5B:
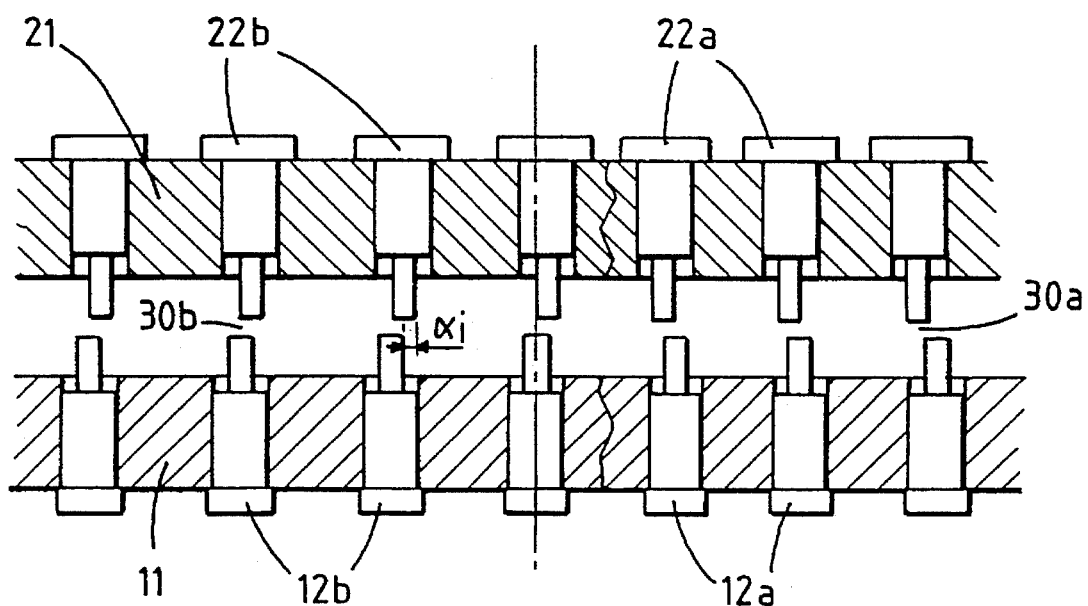

If FIGS. 5A and 5B are more particularly considered, it can be noted that if there is no exterior torque, an initial angular shift (αi) exists between the angular positions of the magnetic pins of first rotor 10 and the angular positions of the magnetic pins of second rotor 20. It is important to note that this initial angular shift between the magnetic pins of the first and second rotors is identical (thus ensuring a strict identity of the measuring gap reluctances when the torque is NIL) but in an opposite direction on the first and second coils.

So, when an exterior torque C which is not NIL, is applied between the rotating shaft sections 1, 2 on its twistable part 3, and therefore between rotors 10, 20, a relative angular shift y is created between pins 12a, 22a; 12b, 22b which are facing each other through measuring gaps 30a, 30b. The shift produces a variation of these gap reluctances in opposite directions on the first and second coils. Therefore a corresponding inverse variation of the magnetic flux going through these pins is generated by the static excitation means is created.

Figure 6:
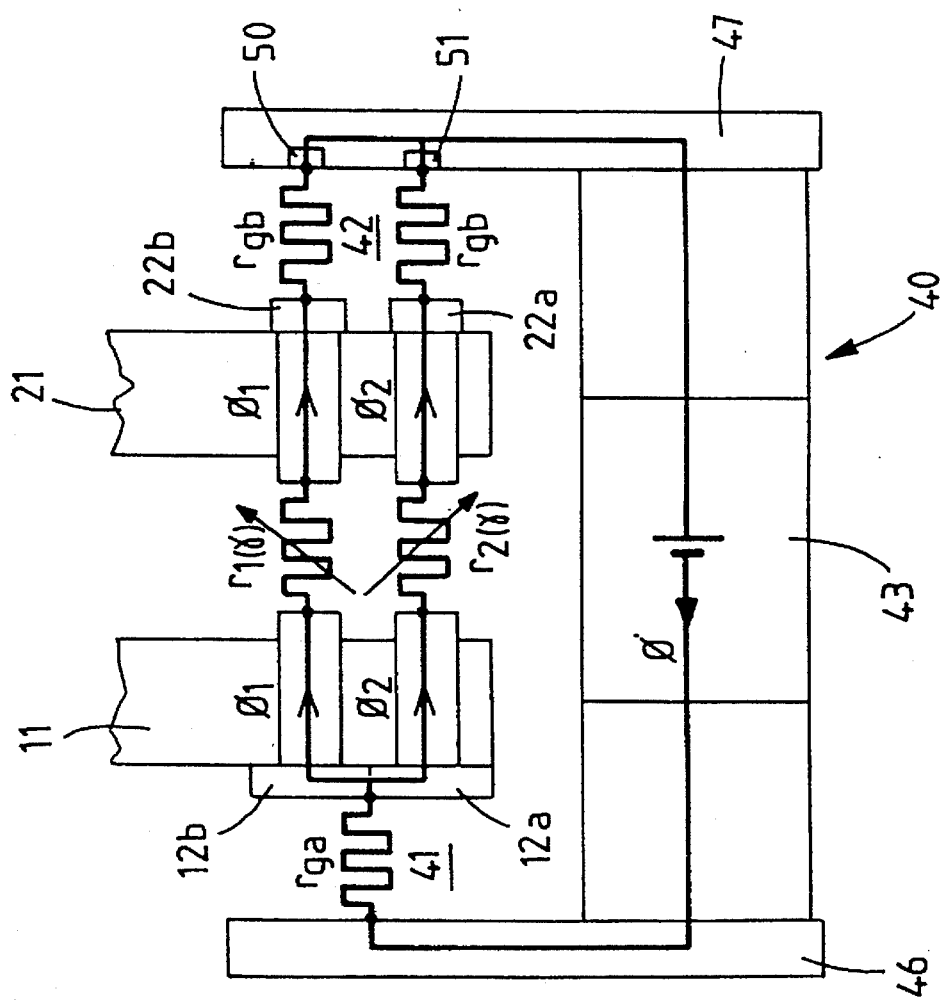
FIG. 6 is an electric diagram of the measuring magnetic circuit of the invention.

FIG. 6 is an electric diagram equivalent to the magnetic measuring circuit allowing for a better understanding of the magnetic flux distribution in the various elements of the double magnetic comparator.

The excitation flux o of exterior magnetic circuit 40 is distributed, through smooth gaps 41,42 with a constant reluctance rga and rgb, to the magnetic pins of the first and second coils which flux φ1 and φ2 flow on respectively. The geometric structure of the comparator shows two parallel magnetic circuits, with reluctances r1(γ)+rgb and r2(γ)+rgb, subject to the same magneto motive force produced by permanent magnet 43.

Inductions B1 and B2 present at the level of smooth gap 42 being proportional to the corresponding flux φ1 (γ) and φ2(γ), it is possible starting from the signals s1 and s2 delivered by magnetic sensors 50,51, to determine ratio $S(\gamma)=(s2-s1)/(s2+s1)=(B2-B1)/(B2+B1)=(r1(\gamma)-r2(\gamma)/(r1(\gamma)+r2(\gamma)+2rgb)$ that is, for small angles γ (linear field of measurement) given:

$$r1\ (\gamma)=r0(1+k\gamma)$$

the following comes:

$$S(\gamma)=k\gamma/(1+rgb/r0)$$

The output signal S(γ) is therefore directly proportional to the angle of torsion and consequently to torque C(γ) exerted on the rotating shaft, parameters k, rgb, r0 being constants depending only on the device geometry. So, by this differential measurement all the variations other than the angular variation γ between the rotors are eliminated and the external effects of the measurement circuit are cancelled.

Figure 7:
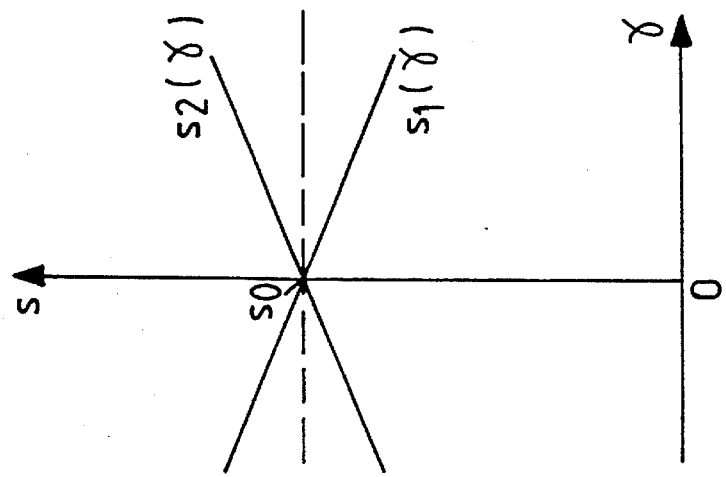
FIG. 7 is a curve representing the variations at the magnetic pins of the magnetic induction measuring sensors depending on the angle of torsion γ.

FIG. 7 shows the variations of the output voltage at the pins of the magnetic measurement sensors 50,51, in the above-mentioned linear field, depending on angle γ. A fine adjustment of the measurement device "zero" (made necessary by the inexact identity of the sensors) can be done mechanically by slightly moving the sensors in their housing or more simply by an electronic adjustment of the treatment circuit 60 which will be described with reference to FIG. 8.

The treatment circuit 60 processes the analog signals delivered by sensors 50 and 51. It also comprises the feed circuits of sensors 600 and eventually 610 necessary to control the means of excitation. The signals delivered by these two sensors are respectively supplied to two input amplifiers 620, 630 which, in addition to their natural function of amplification ensure a compensation of the zero shift and adjust the sensibility of the concerned sensor. Moreover, these amplifiers ensure a filtering function of the high frequencies. The output signals of these amplifiers are then delivered on the one hand to an adding circuit 640 and on the other hand to a subtracting circuit 650 respectively in charge of the elaboration of the s2−s1 difference and of the s2+s1 total. Then an analog divider 660 calculates the ratio S from the output signals of circuits 640 and 650, a voltage-to-current converter delivering a more usable signal at the output of the divider.

Various test samples referenced A to G make it possible to adjust and control the treatment circuit operation which is itself preferably fed by a stabilized reference voltage (e.g. in 28 V). Of course, this treatment circuit might also comprise an analog-digital converter to transform the analog signal supplied by the sensors into a digital signal that is easier to exploit.

Figure 11:
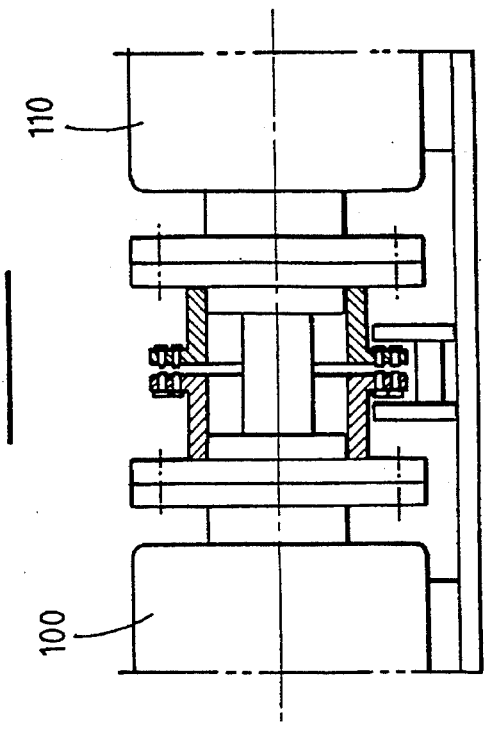
FIG. 11 is an axial cutaway view showing another particular example of torsion meter implementation according to the invention.

FIGS. 9 and 11 show two examples of the application of the magnetic torsion measuring device according to the invention in which the twistable part of the rotating shaft is replaced by a torsion shaft 3a inserted between two rotating shaft sections 1, 2. The device in FIG. 9 is especially adapted to the torque measurement in laboratory with the advantage of reliability for the measurement of torque in both directions when stopped, and the calibration can be carried out in static position.

The extremities of shaft section 1, 2, on which torsion shaft 3a is pressed, are mounted in bearings 80,82. An exterior casing made of two parts 84, 86 surrounds the torsion shaft 3a and all the various elements which compose the torsion meter. The exterior magnetic circuit 40 is directly attached on one of parts 84 of the casing while rotors 10, 20 are anchored on torsion shaft 3a extremities attached on the rotating shaft sections.

In order to protect torsion shaft 3a against accidental overtorques and maintain the relative angular displacement between the rotors in a range of values lower than the pin half width, a mechanical protective device (not represented) can be usefully implemented to limit these angular displacements. This mechanical protective device can be simply made of at least one male element (e.g. a finger) interdependent with one of the first and second rotors and at least one female receiving element interdependent with the other of the first and second rotors to receive this male element with a predetermined clearance.

The device in FIG. 11 shows a torsion meter according to the invention interposed between a motive means 100 and a receiving means 110 of a complicated kinematic chain. It can be noted that the number of pins of each rotor mainly depends on the diameter of the rotor, and in the case of small diameters (e.g. laboratory instruments), the number of pins can be reduced. For example, the number of pins may be reduced by six to twelve. The pins can also be made in the form of castings made from high resistivity magnetic powder, when the implemented frequencies of use are very high.

It can also be noted that although two magnetic sensors are sufficient to obtain the measurement of the torque applied to the torsion shaft or to the twistable part of a rotating shaft making only a single exterior magnetic circuit 40 necessary, it is possible to locate several circuits around rotors 10, 20 to ensure a better safety to the torsion meter by a redundancy of the results. For instance, it is possible to implement two measuring devices each comprising an exterior magnetic circuit 40 and diametrically opposite to rotors 10, 20. Such a redundancy can above all be looked for in applications in the field of automobiles where such a magnetic torsion meter can be used, as in the case of power assisted steering, anti skid or motor power control.

We claim:

1. A magnetic torsion meter for measuring torque exerted on a rotating assembly, the magnetic torsion meter comprising:

first and second rotors respectively connected to a first and a second section of a rotating shaft, said first and second rotors each comprising an annular disk made of nonmagnetic material and two concentric coils of ferromagnetic pins, pins of said first rotor facing pins of the second rotor, while defining two measuring gaps;

an exterior magnetic circuit including two gaps;

a continuous magnetic source of excitation bounded by said exterior magnetic circuit and creating a magnetic flux;

at least two magnetic induction sensors housed in one of said gaps of said magnetic circuit measuring magnetic flux; and a treatment circuit connected to said sensors, said treatment circuit producing an electric output signal proportional to the torque exerted on the rotating assembly.

2. A magnetic torsion meter according to claim 1, wherein said ferromagnetic pins are T-shaped, pins of said coils of said first rotor being connected magnetically two by two, and pins of said coils of said second rotor being inversely magnetically isolated.

3. A magnetic torsion meter according to claim 1, wherein said rotating shaft comprises a twistable shaft section of an existing shaft, wherein said first and second rotors are mechanically connected through two rigid hemicylindrical sections surrounding said twistable shaft section to two sections separated from said rotating shaft and subjected to the angle of torsion.

4. A magnetic torsion meter according to claim 1, wherein said exterior magnetic circuit is U-shaped.

5. A magnetic torsion meter according to claim 1, wherein said torsion meter includes a plurality of U-shaped fixed magnetic circuits, magnetic induction sensors and treatment circuits distributed at a periphery of said disks of said first and second rotors.

6. A magnetic torsion meter according to claim 1, wherein said continuous source of magnetic excitation comprises a magnet.

7. A magnetic torsion meter according to claim 1, wherein said continuous source of magnetic excitation comprises a solenoid.

8. A magnetic torsion meter according to claim 1, wherein said magnetic induction sensors are Hall effect sensors.

9. A magnetic torsion meter according to claim 1, wherein said magnetic induction sensors are magneto resistors.

10. A magnetic torsion meter according to claim 1, wherein said ferromagnetic pins comprise a conventional ferromagnetic material.

11. A magnetic torsion meter according to claim 1, wherein said ferromagnetic pins are sintered from high resistivity magnetic powder.

12. A magnetic torsion meter according to claim 4, wherein feed circuits of said magnetic induction sensors and said treatment circuit are located against one of the exterior lateral walls of said U-shaped fixed magnetic circuit.

13. A magnetic torsion meter according to claim 1, further comprising a mechanical protective device limiting the relative angular displacement between said first and second rotors to limit the maximum torque applicable to said rotating shaft, wherein said mechanical protective device includes at least one male element interdependent with one of said first and second rotors and at least one female receiving element interdependent with the other of said first and second rotors to receive said male element with a predetermined clearance.

14. A motor operator servo control device including a magnetic torsion meter, said torsion meter comprising:

first and second rotors respectively connected to a first and a second section of a rotating shaft, said first and second rotors each comprising an annular disk made of nonmagnetic material and two concentric coils of ferromagnetic pins, pins of said first rotor facing pins of the second rotor, while defining two measuring gaps;

and exterior magnetic circuit including two gaps;

a continuous magnetic source of excitation bounded by said exterior magnetic circuit and creating a magnetic flux;

at least two magnetic induction sensors housed in one of said gaps of said magnetic circuit measuring magnetic flux; and a treatment circuit connected to said sensors, said treatment circuit producing an electric output signal proportional to the torque exerted on the rotating assembly.

15. An engine including an engine shaft connected to a magnetic torsion meter, said torsion meter comprising:

first and second rotors respectively connected to a first and a second section of a rotating shaft, said first and second rotors each comprising an annular disk made of nonmagnetic material and two concentric coils of ferromagnetic pins, pins of said first rotor facing pins of the second rotor, while defining two measuring gaps;

and exterior magnetic circuit including two gaps;

a continuous magnetic source of excitation bounded by said exterior magnetic circuit and creating a magnetic flux;

at least two magnetic induction sensors housed in one of said gaps of said magnetic circuit measuring magnetic flux; and a treatment circuit connected to said sensors, said treatment circuit producing an electric output signal proportional to the torque exerted on the rotating assembly.

16. An engine according to claim 15, wherein said engine is electric.

17. An engine according to claim 15, wherein said engine is thermal.

* * * * *